July 15, 1952   A. A. KALINSKE   2,603,460
DISSOLVING AND SLURRYING TANK
Filed June 1, 1950
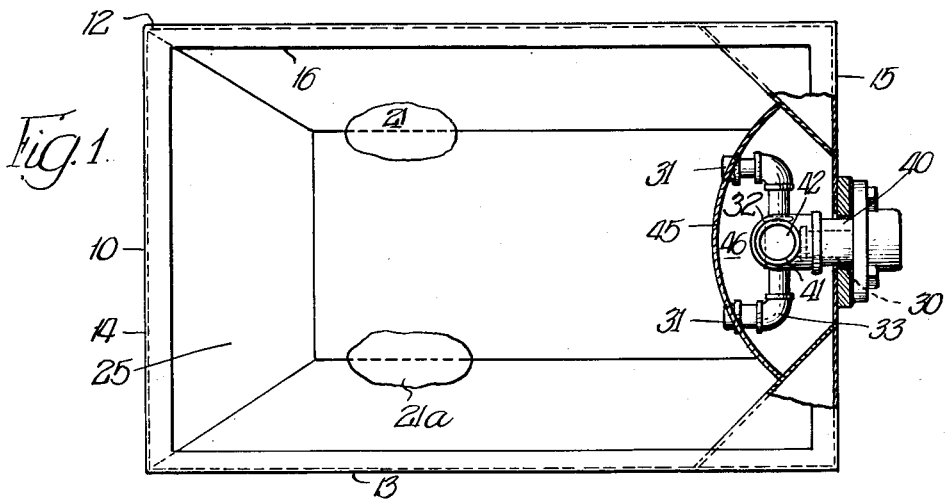
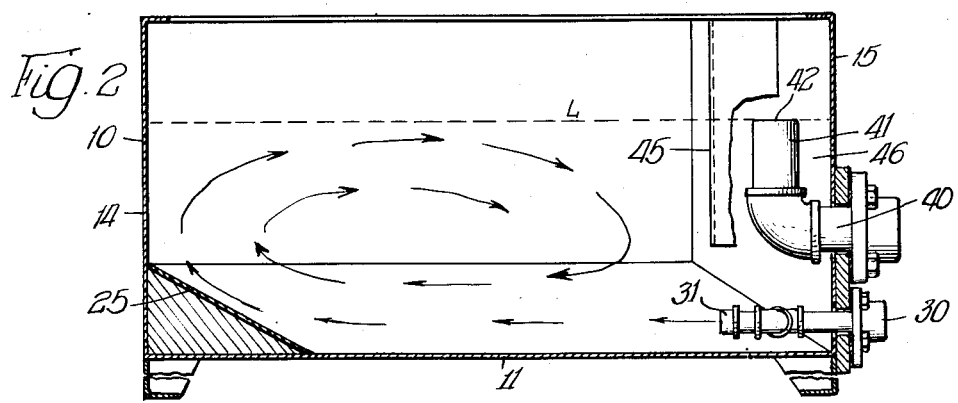
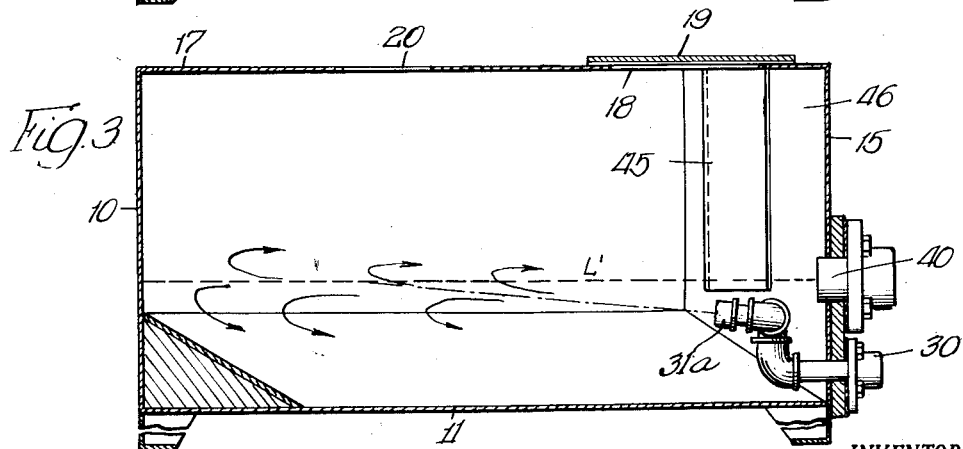
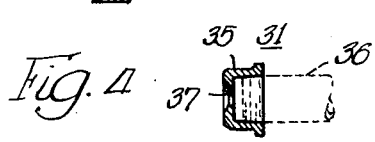
INVENTOR.
Anton A. Kalinske,
BY
agent Patented July 15, 1952

2,603,460

UNITED STATES PATENT OFFICE 2,603,460

DISSOLVING AND SLURRYING TANK

Anton A. Kalinske, Elmhurst, Ill., assignor to Infilco Incorporated, Chicago, Ill., a corporation of Delaware Application June 1, 1950, Serial No. 165,525

8 Claims. (Cl. 259—4)

This invention relates to an apparatus for dissolving or slurrying chemicals.

It is an object of this invention to provide an apparatus wherein chemicals can be quickly dissolved or slurried.

Another object is to provide a dissolving tank with a flow pattern conducive to rapid and thorough mixing of water and chemicals and elimination of any settling of undissolved chemicals on the tank bottom.

Another object of the invention is to provide a dissolving apparatus which is so constructed and dimensioned that only very fine, colloidal particles of undissolved chemical can be carried away by the outflowing solution.

Another object of the invention is to provide an apparatus for hydraulically dissolving or slurrying chemicals.

A specific object of the invention is to provide a dissolving or slurrying tank adapted to support a chemical dry feeder, chemicals dispensed by the feeder dropping directly into the tank and being picked up by and mixed with a jet or jets of liquid under pressure directed at the location where the chemicals strike the liquid surface in the tank.

Another object is to provide an apparatus of this general type which requires only minor adjustments to serve either as a dissolving tank or as a wetting or slurrying tank.

Another object is a dissolving or slurrying tank which is readily adjustable with regard to the detention time in the apparatus.

Another object is to provide an apparatus for dissolving of chemicals which is readily adjustable with regard to the strength of the solution prepared in the apparatus.

Other objects of the invention will become apparent upon consideration of the description and claims which follow.

The apparatus of this invention is particularly suitable for use with and arranged underneath a chemical dry feeder from which the chemicals to be dissolved or slurried can drop directly into the dissolving or slurrying tank. The invention will, therefore, be described in connection with such an arrangement. However, it will be understood that the invention is not limited to this particular location of the feeder. The feeder may be mounted separately, and chemicals dispensed by the feeder be introduced into the tank by any suitable means, such as for example by a chute.

The invention will be more readily understood by reference to the drawings which form a part hereof and wherein Figure 1 is a plan view of a preferred embodiment of the invention applied to a dissolving apparatus;

Figure 2 is a vertical cross-sectional view of the apparatus of Figure 1 with parts broken away;

Figure 3 is a vertical cross-sectional view of a preferred embodiment of the invention applied to a slurrying apparatus; and Figure 4 is an enlarged vertical cross-sectional view of a jet nozzle of the apparatus.

The apparatus comprises a tank 10 which is preferably rectangular and has a flat bottom 11, side walls 12 and 13, and end walls 14 and 15. The tank may be open and have flanges 16, as shown in Figure 1, to support the base plate of a chemical feeder, not shown, or a cover 17 may be provided, as shown in Figure 3, which serves as the supporting base for a feeder. With a closed tank an opening 18 is provided in the cover to afford access to the interior of the tank, and the opening 18 is normally closed, as by a plate 19, which may be held in position by any suitable means, such as screws, not shown. The base plate of the feeder, or the top of the tank 10, as the case may be, is suitably apertured, as at 20 (Figure 3), to permit the chemical extruded by the feeder to drop directly into the tank 10. Thus, for example, when the feeder is of the type described in the patent of Walter J. Hughes, Patent No. 2,520,545, two apertures are provided, one for each discharge end of the reciprocating feed tray and the chemicals will fall into the tank 10 at approximately the locations indicated by the numerals 21 and 21a in Figure 1.

Along the side walls 12 and 13 and one of the end walls, such as 14, fillets 25 are provided which may form an angle of approximately 30° to the horizontal.

The liquid for dissolving or slurrying the chemical is admitted, and the solution or slurry formed in the tank is withdrawn through the other end wall, 15. Due to this arrangement the necessary piping is cut down to a minimum. All pipe connections are at one end wall of the tank, which may be in the rear of the feeder, thus leaving the front wall and the sides entirely free from unsightly piping. Liquid under pressure arrives through an inlet conduit 30 and is discharged into the tank through one or more jet nozzles 31. Some times a single centrally disposed nozzle is sufficient, but normally it is preferred to use a pair of jet nozzles, symmetrically arranged as shown in Figure 1. In some cases it may be desirable to use three symmetrically spaced nozzles. In the preferred embodiment of Figure 1 the inlet conduit 30 connects to a T 32 whose ends are connected to L's 33 which carry the jet nozzles 31. As best shown in Figure 4, each jet nozzle comprises an internally threaded orifice cap 35, screwed on the threaded outer end of a nipple 36, the inner end of the nipple 36 being screwed into the outer end of L 33. The cap has a suitable orifice 37 as shown.

The rate of inflow is determined from the maximum rate of chemical feed in order to get the desired solution strength. The orifices 37 are sized to provide the necessary inflow rate at a pressure during flow of not less than about thirty pounds. If the pressure exceeds thirty pounds, a pressure reducing valve, not shown, should be installed on the inlet line. Several interchangeable caps 35 with orifices of different size may be provided. When it becomes necessary to prepare a stronger or a weaker solution, the cap 35 is simply exchanged for one with a larger or a smaller orifice 37, respectively, to admit more or less water to the tank and obtain a solution of desired strength. In this manner a variable quantity of water enters the tank to prepare solutions of varying strength. The velocity of the water, however, remains constant as the pressure is constant.

The jets issuing from the orifices 37 are directed horizontally toward the opposite end of the tank 10 and the location where the chemicals fall into the tank. Thus the chemicals are quickly picked up by, and mixed with, the vigorously circulating water. The flow pattern induced by the jets, indicated by the arrows in Figure 2, keeps the chemicals in suspension and in continuous agitation and thus insures maximum speed of solution or wetting and slurrying, and prevents sedimentation of undissolved chemicals to the tank bottom.

The solution or slurry leaves the tank through an outlet conduit 40. In the embodiment of Figures 1 and 2 an overflow tube 41 is provided which discharges into the outlet conduit 40. The elevation of the overflow edge 42 of the tube 41 controls the normal liquid level L in the tank. The tube 41 may be simply a piece of pipe which can be cut to any proper length so that the overflow edge 42 can readily be located at a suitable elevation to provide the necessary detention time for any chemical to be dissolved or slurried.

A baffle 45 extends downwardly from an elevation above the normal liquid level in the tank to an elevation above the nozzles 31, as shown. The baffle 45 prevents short circuiting of liquid along the liquid surface to the overflow edge 42 of tube 41, all liquid being forced to pass under the lower edge of the baffle 45 to reach the overflow. The baffle 45 also provides a quiescent outlet chamber 46 which is undisturbed by the turbulence set up in the tank by the water jets. The area of the outlet chamber 46 should be sufficiently large to provide a low upflow velocity at which only the finest colloidal particles of undissolved chemicals can be carried up by the solution flowing to the overflow edge 42 of tube 41. Thus no large undissolved particles can possibly leave the tank.

For any given rate of inflow, under the thirty pound pressure, the vigor of the agitation increases as the water depth decreases in the tank. Therefore, for slurrying or wetting of materials, such as carbon or lime or diatomaceous earth, the water depth is kept at a minimum. In the construction of Figures 1 and 2 the overflow tube 41 would be considerably shortened if the apparatus were used for slurrying; preferably, however, the simpler construction of Figure 3 is used therefor.

In the embodiment of Figure 3, the overflow tube is eliminated and the slurry leaves the tank directly through the outlet conduit 40. The elevation of the outlet conduit 40 determines the normal liquid level $L^1$ in the tank. In this embodiment the nozzles 31a are preferably slightly inclined upwardly so that the jets issuing therefrom are directed toward the points where the chemicals strike the liquid surface. This provides immediate pick-up of the chemical by the jets and provides the necessary surface agitation for wetting of the dry chemical. Otherwise, the apparatus of Figure 3 is the same as described in connection with Figures 1 and 2.

It will be seen that I have invented a compact, efficient and highly flexible apparatus which needs only minor adjustments for widely varying conditions. The apparatus is readily adapted to serve either for dissolving or for slurrying of chemicals. The apparatus is also adjustable with regard to the detention time and to the strength of the solution. By varying the elevation of the outlet which determines the liquid level in the tank the proper detention time for more or less soluble or wettable chemicals can be provided. By selecting a jet orifice of proper diameter the strength of the solution can be varied. The velocity of the water remains constant so that at all times and under all conditions proper agitation and mixing is insured. This permits the use of a standard apparatus for dissolving and for slurrying of a variety of chemicals for different purposes. The total absence of moving parts in the apparatus insures its foolproof operation. The arrangement of all piping at one end of the tank provides both compactness and sightliness.

Many modifications of the apparatus may be made without departing from the spirit and scope of the invention. Accordingly I do not wish to limit myself to the exact details of the embodiments shown and described for purposes of illustration.

I claim:

1. Apparatus of the type described comprising a tank adapted to receive chemicals through its top, said tank having a bottom, side walls and end walls, fillets along the lower portion of said side walls and one of said end walls, an outlet leading from the other end of said tank, said outlet establishing the normal liquid level in said tank, a baffle surrounding said outlet and extending upwardly to an elevation above said normal liquid level, and inlet means for liquid under pressure including a jet orifice discharging longitudinally into said tank toward said one end wall, said orifice being at an elevation below said normal liquid level and being symmetrically arranged with respect to the width of said tank.

2. The apparatus of claim 1 wherein said jet orifice is inclined upwardly at an angle from the horizontal so that liquid discharging therefrom strikes the liquid surface adjacent the point of introduction of the chemical.

3. The apparatus of claim 1 wherein said jet orifice is mounted to discharge horizontally.

4. Apparatus of the type described comprising a tank having an apertured top through which chemicals can be dropped into the tank, an outlet means mounted in one end wall of said tank with its intake opening a predetermined distance above the tank bottom, said outlet establishing the normal liquid level in said tank, a baffle in front of said outlet means and extending from an elevation above to an elevation below the level of said intake opening, an inlet means for liquid under pressure including at least one jet orifice adjacent said one end wall of said tank at an elevation below said baffle, said jet orifice discharging longitudinally toward the other end wall of said tank.

5. Apparatus of the type described comprising a rectangular tank having a bottom, side walls and end walls, fillets along the lower portions of said side walls and of one of said end walls, an outlet from said tank leading through the other end wall of said tank at a point equally spaced from said side walls, said outlet establishing the normal liquid level in said tank, a baffle surrounding said outlet and extending upwardly to an elevation above said liquid level, means for introducing liquid under pressure into said tank, said means including a pair of jet orifices discharging into said tank longitudinally toward said one end wall, said orifices being equally spaced from the respective side walls and at a lower elevation than said outlet, and means for introducing a chemical into said tank.

6. Apparatus for dissolving chemicals comprising a dissolving tank having a cover adapted to support a feeder for dry chemicals, said cover being apertured subjacent the extrusion points of said feeder so that measured quantities of the chemical extruded by said feeder can drop directly into said dissolving tank, an outlet from one end portion of said tank, said outlet including an overflow and conduit means leading from said overflow to outside of said tank, a baffle surrounding said overflow and extending to an elevation above said overflow, and inlet means for liquid under pressure including a plurality of jet orifices at an elevation below said overflow and symmetrically arranged with regard to the width of the tank and discharging longitudinally toward the end portion of said tank opposite said outlet.

7. Apparatus of the type described comprising a tank having a bottom, side walls and end walls, fillets along the lower portion of said side walls and of one of said end walls, an outlet from said tank leading through the other end wall and establishing the normal liquid level in said tank, a baffle surrounding said outlet and extending from an elevation above the normal liquid level downwardly at least to the elevation of said outlet, an inlet for chemicals through the top of said tank near said one end wall, liquid inlet means through said other end wall of said tank, said inlet means including a pair of jet orifices symmetrically located with regard to the width of said tank and at an elevation below the lower end of said baffle.

8. Apparatus of the type described comprising a tank having a bottom, side walls and end walls, a baffle forming with one of said end walls an outlet chamber, an outlet from said tank having its intake in said outlet chamber a predetermined distance above said bottom intermediate the upper and lower edges of said baffle, and inlet means for liquid under pressure including at least one jet orifice discharging longitudinally in said tank from adjacent said one end wall toward the opposite end wall, said inlet means being at an elevation below said baffle.

ANTON A. KALINSKE.

REFERENCES CITED

The following references are of record in the file of this patent:

UNITED STATES PATENTS

| Number | Name | Date |
| --- | --- | --- |
| 732,637 | Insley | June 30, 1903 |
| 1,000,689 | Paterson | Aug. 15, 1911 |
| 1,157,092 | Du Rell | Oct. 19, 1915 |
| 1,580,476 | Fassio | Apr. 13, 1926 |
| 1,775,554 | Dehle | Sept. 9, 1930 |
| 1,783,415 | Dehle | Dec. 2, 1930 |
| 1,991,148 | Gephart | Feb. 12, 1935 |
| 2,241,940 | Atkins et al. | May 13, 1941 |
| 2,301,203 | Doane | Nov. 10, 1942 |